United States Patent [19]
Chen et al.

[11] Patent Number: 5,848,149
[45] Date of Patent: Dec. 8, 1998

[54] SUBSCRIBER LINE INTERFACE AND POWER CIRCUIT

[75] Inventors: Robert K. Chen, North Andover, Mass.; Paul W. Frazier, Mesquite, Tex.; John C. Gammel, Marion Township, Berks County, Pa.; Andrew J. Marsh, Garland; Apurba Roy, Rockwall, both of Tex.; Dewayne Alan Spires, Plaistow, N.H.

[73] Assignee: Lucent Technologies Inc., Murray Hill, N.J.

[21] Appl. No.: 451,249

[22] Filed: May 26, 1995

[51] Int. Cl.$^6$ ....................................................... H04M 1/74
[52] U.S. Cl. ........................ 379/399; 379/350; 379/373; 379/377
[58] Field of Search ..................... 379/399, 377, 379/414, 418, 373, 374, 164, 165, 375, 251, 252, 257, 258, 350, 282

[56] References Cited

U.S. PATENT DOCUMENTS

| | | | |
|---|---|---|---|
| 4,327,253 | 4/1982 | Lechner | 379/384 |
| 4,406,929 | 9/1983 | Pace et al. | 379/402 |
| 4,450,556 | 5/1984 | Boleda et al. | 370/58 |
| 4,571,462 | 2/1986 | Janssen | 379/386 |
| 4,585,905 | 4/1986 | Brown | 379/412 |
| 4,669,110 | 5/1987 | Daie et al. | 379/165 |
| 4,850,012 | 7/1989 | Mehta et al. | 379/374 |
| 4,856,059 | 8/1989 | Halbig | 379/412 |
| 5,109,409 | 4/1992 | Bomgardner et al. | 379/257 |
| 5,134,651 | 7/1992 | Ortiz et al. | 379/257 |
| 5,228,081 | 7/1993 | Warner et al. | 379/399 |
| 5,253,291 | 10/1993 | Naseer et al. | 379/410 |
| 5,347,575 | 9/1994 | Naseer et al. | 379/377 |
| 5,473,682 | 12/1995 | Tanaka | 379/377 |
| 5,694,465 | 12/1997 | Apfel | 379/377 |

OTHER PUBLICATIONS

IEEE Journal of Solid–State Circuits, V.19, No. 6, Dec. 1984, "*A Single–Chip High–Voltage Shallow–Junction BORSHT–LSI*", T. Ohno, et al pp. 899–905.
Unitrode Applications Handbook, 1985–86, Unitrode Corp., Lexington, MA., Sec.U–76; pp. 86–94.
Harris Semiconductor Linear and Telecom Databook, pp. 8–90–8–97.
Studies in Electrical and Electronic Engineering 45, "Pulse Width Modulated (PWM) Power Supplies", Valter Quercioli, Elsevier 1993; pp. 5–10.

*Primary Examiner*—Fan S. Tsang
*Assistant Examiner*—Jacques M. Saint-Surin
*Attorney, Agent, or Firm*—Frederick B. Luludis

[57] ABSTRACT

A subscriber line circuit which truly implements all of the BORSCHT functions and which does not rely on an external ringing generator to provide the ringing voltage when needed is disclosed. This implementation is achieved by recognizing that supervisory and ringing signals occur in some sort of sequence and, therefore, do not have to be generated simultaneously. Based on this recognition, we provide a circuit which truly implements all of the BORSCHT functions and includes a power section that generates each of the supervisory signals, e.g., –48 volts and –24 volts, and alerting signal, e.g., ringing signal, in turn and as required.

9 Claims, 2 Drawing Sheets

SUBSCRIBER LINE INTERFACE AND POWER CIRCUIT

FIELD OF THE INVENTION

The invention relates to telephone Subscriber Loop Interface Circuits (SLIC) providing so-called BORSCHT functions.

BACKGROUND OF THE INVENTION

A subscriber line interface circuit (or SLIC) serves as an interface between a subscriber telephone line and a digital switching system. A SLIC provides what is commonly referred to as BORSCHT functions as well as a digital to analog conversion between the digital switching system and telephone line. The BORSCHT functions include Battery feed, Overvoltage protection, Ringing, Supervision, Codec, Hybrid and Testing. It appears, however, that the present technology is directed to moving the BORSCHT functions to the serving terminal of the outside loop plant which provides the connections between the telephone lines extending to a customer's telephone station sets and a local or central switching system. That is, the serving terminal is the apparatus which connects the telephone "drop" line extending to a telephone subscriber's premises and the local or central office switching system.

We have recognized, however, that prior art SLIC circuits do not actually provide all BORSCHT functions. For example, such circuits are not capable of generating the ringing voltage (R) and, therefore, have to rely on an external (e.g., central office) ringing generator to supply the ringing voltage to a subscriber's line. It can be appreciated, then, that plant, then a ringing generator would also have to be moved to the serving terminal to provide the ringing voltage, when needed, to the telephone drop lines connecting to the serving terminal. It can be appreciated then that prior art SLIC circuits are indeed limited.

SUMMARY OF THE INVENTION

Accordingly, an object of the present invention is to provide a subscriber line circuit which truly provides all of the BORSCHT functions and does not rely on an external ringing generator to provide the ringing voltage when needed. We achieve this result and advance the relevant art by recognizing that supervisory and ringing signals occur in some sort of sequence and, therefore, do not have to be generated simultaneously. Based on this recognition, we have developed, in accord with the invention, a circuit which truly implements all of the BORSCHT functions and includes a power section that generates each of the supervisory signals, e.g., −48 volts and −24 volts, and alerting signal, e.g., ringing signal, in turn and as required.

DETAILED DESCRIPTION

Figure 1:
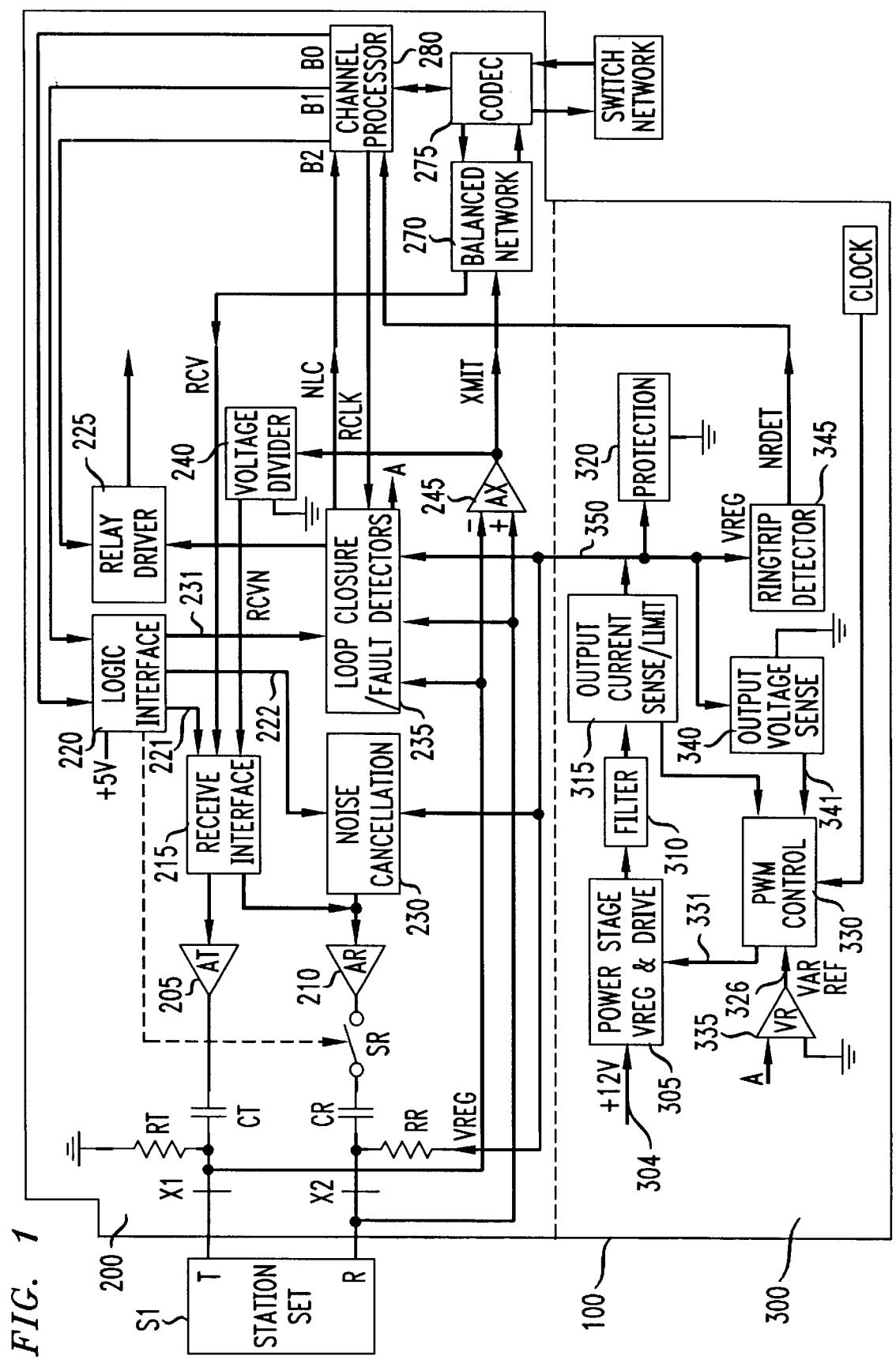
FIG. 1 is a block diagram of a subscriber line interface circuit in which the principles of the invention may be practiced.

Turning to FIG. 1, Subscriber Line Interface and Power (SLIP) circuit 100 includes power section 300 and telephony section 200 for providing each of the BORSCHT functions.

Power section 300, more particularly, includes power stage 305 which generates each of the supervisory signals, e.g., −48 volts and −24 volts, and alerting signal, e.g., ringing signal, responsive to the type of control signal that it receives from Pulse Width Modulation Control (PWMC) circuit 330 via lead 331. Power stage 305 supplies the generated signal (designated VREG in the FIG.) to conventional high-frequency filter 310. Filter 310 "smoothes out" VREG by removing a high-frequency noise component from VREG and supplies the result to a conventional current sense/limit circuit 315. Current sense/limit circuit 315, in a conventional manner, monitors the level of current on bus 350 to "sense" the presence of an inadvertent error condition, e.g., a ground fault. That is, circuit 315 compares a predetermined error level with the level of current that VREG is supplying to bus 350. If the latter level meets or exceeds the former level, then circuit 315 concludes that a ground fault is present on bus 350 and supplies an inhibit signal to PWMC circuit 330. Circuit 330, responsive to the inhibit, supplies a "shut down" signal to power stage 305 via lead 331. Power stage 305, in turn, stops generating VREG.

Output voltage sense circuit 340, on the other hand, divides the level of VREG appearing on bus 350 by a predetermined factor, e.g., a value of 100, and supplies the result to PWMC circuit 330 via lead 341. For example, if VREG is, e.g., −48 V (−24 V), then circuit 340 supplies a −480 millivolt (−240 mv) signal to circuit 330. Circuit 330, in turn, compares the level of the signal that it is receiving via lead 341 with the level of the reference signal (VAR REF) that it is receiving from voltage follower circuit 335 via lead 326. Circuit 330 then adapts the signal that is outputting to lead 331 to account for the difference, thereby providing a regulating function to adapt VREG to a level specified by the level of VAR REF. The path from bus 350 to output voltage sense 340 and thence to PWMC circuit 330 via lead 341 thus constitutes a linear feedback arrangement for regulating the level VREG. (It is noted that PWMC circuit 330 may be similar to the teaching set forth in the publication *Studies in Electrical and Electronic Engineering 45—Pulse Width Modulated (PWM) power Supplies*, by V. Quercioli, published by Elsevier, 1993, pp. 5–10, which is incorporated herein by reference; and power stage 305 may be similar to the teaching set forth in the *Unitrode Applications Handbook* 1985–1986, Application N U-76 —Flyback and Boost Switching regulator Design Guide, published by Unitrode Corporation, 5 Forbes Road, Lexiton, Ma. 02173, pp. 86–94, which is also incorporated herein by reference.)

Briefly referring to telephony section 200, loop closure detector circuit 235 monitors the dc. loop resistance across the Tip (T) and Ring (R) leads extending to telephone station set SI. As is well-known, the resistance of such a loop is typically very large (thousands of ohms) or relatively small (possibly several hundred ohms or less) when station set S1 is respectively on-hook or off-hook. When station set S1 is on-hook (also referred to herein as a steady state), loop closure detector circuit 235 thus detects a very large resistance across the T and R leads. In that case, circuit 235 outputs, for example, −480 millivolts dc. to lead A extending to one input of follower circuit 335. Follower 335 supplies that voltage level to PWMC circuit 330 as VAR REF. Circuit 330, in turn, supplies to lead 331 a signal having, in accord with an aspect of the invention, a duty cycle corresponding to the level of VAR REF. That is, when VAR REF is −480 millivolts dc., then PWMC circuit 330 outputs a signal having an appropriate duty cycle to lead 331 ,e.g., a duty cycle selected in accord with the teachings disclosed in the aforementioned references. Power stage 305 converts the voltage level that it receives via lead 304 into a signal having a level controlled by the duty cycle of the signal that it receives via lead 331. Power stage 305, in turn, converts the supply voltage level, e.g., +12 V, supplied via lead 304 into a −48 V dc signal. Power stage 305 then outputs the result to filter 310 as VREG, as mentioned above.

When station S1 goes from an on-hook state to an off-hook state, loop-closure detector circuit 235 then detects a relatively low resistance across the T and R leads and changes the level of the signal that it is outputting to lead A. For example, circuit 235 outputs −240 millivolts dc. to lead A. PWMC circuit 330, responsive to the change in VAR REF, outputs a signal to lead 331 having a duty cycle corresponding to the new VAR REF, as mentioned above. Power stage 305, in turn, converts the voltage level, or signal, supplied to lead 304 to −24 Vdc and outputs that signal as VREG.

Power stage 305 also generates a ringing signal that is supplied as VREG to ring lead R via resistor RR. Specifically, when the telephone switch (not shown) forwards an incoming call to station set S1, it also transmits a signaling message indicative thereof. The signaling message includes information identifying (a) the channel that is assigned to the call,(b) calling telephone number,(c) called telephone number, etc. In response to receipt of the message via codec 275, channel processor 280 directs logic interface circuit 220 via logic leads B0 and B1 to transmit a ringing signal to station S1 to alert the user thereat to the incoming call. Processor 280 does this by setting the dc. signals on leads BO and B1 to represent one of four states (codes), e.g., 00, 01, 10 or 11. It is assumed herein that state 00 represents a steady state (e.g., a low power scan state) and 11 represents the ringing state. Accordingly, processor 280 applies a logic one (e.g., +5 vdc) to lead B0 and to lead B1. Logic interface circuit 220, responsive to that logic state, notifies circuit 235 via lead 231 to transmit a ringing signal to station S1. Circuit 235, in turn, reshapes the clock signal, e.g., +5 V clock signal, that it receives from processor 280 via lead RCLK into a −1.7 V peak trapezoidal signal varying at a 20 Hz rate and supplies that signal to PWM control circuit 330 via follower circuit 335. PWM control circuit 330 then supplies a signal having a duty cycle varying according to the new VAR REF to lead 331. Logic interface circuit 220 also causes contact SR to operate to isolate amplifier 210 from the ring lead. (It is noted that contact SR is representative of an electronic device capable of effecting a switching function, e.g., a FET device.)

Power stage 305, in response to the signal supplied via lead 331, converts the supply voltage from lead 304 into a −170 V peak trapezoidal signal varying at a 20 Hz rate (ringing signal) and outputs the signal to filter 310 as VREG, which is supplied to ring lead R via circuit 315 and resistor RR. When the user at station S1 answers the call by causing station S1 to go off-hook, the level of current in the T and R loop circuit increases as a result of the decrease in the resistance of the loop. This increase in current is detected by Ring Trip Detector 345, which then changes the logic state of the NRDET lead extending to processor 280.

Processor 280, responsive to the signal on lead NRDET being at a logic state of one, changes the logic state of leads B0 and B1 to 01 (indicative of station S1 being in an off-hook state), which, in turn, causes logic interface circuit 220 to rescind its request for a ringing signal and allow contact SR to resume a normally closed state. In addition, loop closure circuit 235 outputs a −240 mv signal to lead A, thereby indirectly causing power stage 305 to output a −24 V signal as VREG, as discussed above.

It is seen from FIG. 1 that telephony section 200 of SLIP 100 also includes conventional amplifiers 205 and 210 for supplying analog signals, e.g., voice signals, etc., to the T and R leads. More specifically, codec 275 receives digital versions of such analog signals from the telephone network, converts the digital signals to analog signals and then supplies the resulting analog signals to receive interface circuit 215 via balanced network 270. Receive interface circuit 215 then transmits the signals over the T and R leads via amplifiers 205 and 210, respectively, which are a.c. coupled to the T and R leads via capacitors CT and CR, respectively. Receive interface circuit 215, more particularly, comprises a differential pair that provides a dc voltage level translation between the codec signal and the TIP and RING signal. Circuit 215 supplies the resulting analog signal to the T and R for transmission to station S1. Circuit 215 also provides a gain adjustment between the codec and the T and R leads based on system requirements.

Ax amplifier 245, on the other hand, detects analog signals traveling in the opposite direction, i.e., speech signals originating at station S1, and supplies such signals to codec 275 via balanced network 270 and transmission path XMT. AX amplifier 245, more particularly, is a differential amplifier which senses the differential voltage level across the T and R leads, scales the differential voltage by a predetermined factor of, for example, a value of three (3), and outputs the result to transmit path XMT for transmission to codec 275. Codec 275 includes an analog-to-digital converter circuit, which converts analog signals (e.g., speech signals) that are received via path XMT into digital signals for transmission to the public switched network. The signal that amplifier 245 outputs to path XMT is also supplied to voltage divider circuit 240. Voltage divider circuit 240 essentially controls the gain of the feedback path including receive interface circuit 215 such that the gain of the feedback path synthesizes the equivalent output impedance presented to station S1. That is, the feedback loop synthesizes the expected loop impedance, e.g., either 600 or 900 ohms. To say it another way, we create a positive feedback path having a gain of less than one such that the equivalent differential impedance may be multiplied (by the gain of the Ax Amp 245, voltage divider 240 and RCV interface circuit 215) to match the expected impedance.

Telephony section further includes noise cancellation circuit 230 which is designed in a conventional manner to sense any noise signal of a relatively small voltage that is a component of VREG and generate a model of the noise component so that it can be subtracted from the analog signal (voice signal) that receive interface circuit 220 supplies to AR amplifier 210. Basically, noise cancellation circuit 230 synthesizes a current source (i.e., a Norton equivalent circuit equal to the VREG noise signal divided by RR and 180 degrees out of phase with the noise signal) that generates a signal that is somewhat equal to the level of the noise signal but 180 degrees out of phase with that signal. Accordingly, the signal generated by circuit 230 cancels the noise signal "riding" on VREG.

Loop closure circuit 235 includes a differential voltage level comparator circuit to monitor the d.c. resistance across the T and R leads so as to detect when station S1 is either in an on-hook and off-hook state, as discussed above. In addition to controlling the level of the signal that it outputs to lead A to signify a Station S1 on-hook or off-hook state, circuit 235 also outputs a logic one (+5 vdc) or logic zero (ground) to lead NLC to notify processor 280 of the state of station S1. Circuit 235 thus notifies processor 280 whenever station S1 goes from an on-hook to an off-hook state and vice-versa. Processor 280, responsive thereto, sends a signaling message requesting service to the telephone network via codec 275. The telephone network, in turn, returns dial tone, as is done conventionally. Processor 280 also sends a signaling message to the telephone network when station S1 goes from off-hook to an on-hook state as tracked by the logic state on lead NLC. The telephone network may then respond to the latter signaling message by terminating any existing telephone connection extending to station S1.

The fault detection section of circuit 235 includes two differential voltage level comparators designed to detect a predetermined voltage drop, e.g., 36 Vdc, across resistors RR and RT, respectively. The voltage drop is indicative of a fault condition and its presence causes circuit 235 to activate conventional relay driver circuit 225. That is, the output of each differential voltage level comparator is supplied to an OR circuit whose output activates driver circuit 225. When activated, relay driver 225 operates an associated relay (not shown), which, in turn, operates normally closed contacts X1 and X2 to disengage SLIP 100 from the loop extending to station S1. Channel processor 280 may operate relay driver circuit 225 via lead B2 to isolate SLIP 100 from station S1 so that maintenance tests may be performed on SLIP 100.

Logic interface 220 provides an interface between SLIP 100 and processor 280. Specifically, logic interface circuit 220 is a conventional combinatorial circuit which converts a logic state to one of n functions supplied at the output. In the instant case, processor 280 controls the binary input via leads B1 and B2, which may assume one of four logic states, namely 00, 01, 10 and 11, as mentioned above. State 00 is the steady state when station set S1 is on-hook as also mentioned above. During state 00, circuits 215 and 230 are "powered down" via leads 221 and 222 to conserve power. The power up state is 01 and occurs when station S1 is in the off-hook state. State 10 is not used and state 11 is the ringing state, which causes circuit 220 to call for a ringing signal via lead 231 and operate contact SR as mentioned above.

Figure 2:
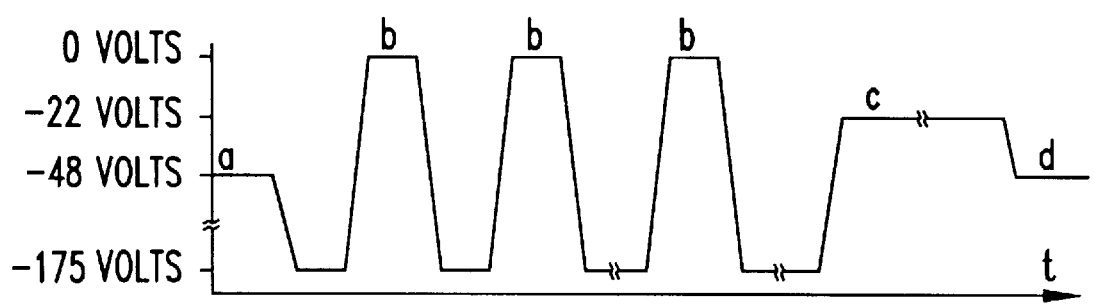
FIG. 2 illustrates a sequence of signals that the subscriber line interface circuit generates in accord with an aspect of the invention.

FIG. 2 is one example of a sequence of signals (voltage levels) that power section 300 generates in response to respective control signals received from telephony section 200, in which the sequence illustrates an on-hook signal level 'a' that is supplied to station S1 as a result of telephony section 200 detecting that station S1 is on-hook. Telephony section 200 may also direct power stage 300 to independently generate a ringing signal illustrated at 'b' in response to receipt of an indicator indicating that the network has an incoming call for station S1. Section 200 may also direct power stage 300 to generate an off-signal 'c' instead of the ringing signal in response to station S1 going off-hook. The FIG. also shows that power stage 300 generates a on-hook signal 'd' as a result of telephony section 200 detecting that station S1 has returned to the on-hook state. Although the FIG. does not indicate so, the next signal in the sequence could be an off-hook signal 'f' that is generated as a result of the station S1 going off-hook to request service, e.g., placing a telephone call. It is noted that the signals shown in FIG. 2 would also be illustrative of the control signals generated by telephony section 200 at lead 'A' if the illustrated signal levels were decreased accordingly.

The foregoing is merely illustrative of the principles of the invention. Those skilled in the art will be able to devise numerous arrangements, which, although not explicitly shown or described herein, nevertheless embody those principles that are within the spirit and scope of the invention.

The invention claimed is:

1. Apparatus for interfacing a telephone station set with transmission facilities comprising means for outputting different sequences of first, second and third control signals respectively indicative of when said station set is on-hook, off-hook and when an associated telephone switch has received an incoming call for said station set, and means for independently generating first and second supervisory signals and a ringing signal in an order corresponding to the sequential order of a current one of said sequences of said control signals, in which the levels of said first, second and third control signals are respectively indicative of the levels of the first and second signals and the ringing signal.

2. Apparatus comprising means for generating in sequence first, second and third control signals, and means, responsive to receipt in turn of a current one of said first, second and third control signals, for independently generating as a function of said one of said first, second and third control signals a corresponding signal selected from a group of signals including an off-hook, ringing and on-hook signals, in which the level of said one of said first, second and third control signals is indicative of the level of the independently generated signal.

3. The apparatus of claim 2 further comprising apparatus for supplying the selected signal to a telephone station set.

4. A subscriber line circuit for interfacing a telephone station set with a transmission facility extending to a switch comprising a signal generator, and a detector that supplies to the signal generator a control signal when the switch indicates receipt of an incoming call, in which the level of the control signal varies over time in accordance with a predetermined rate, the signal generator, responsive to receipt of the control signal generates and outputs to the station set a ringing signal having a level that varies with said rate.

5. A subscriber line interface circuit disposed between a telephone station set and a telephone switch network comprising means for generating and outputting in turn first, second and third control signals, said first and second control signals being respectively indicative of when (a) said station set is on-hook, (b) said station set is off-hook and (c) said telephone switch network has an incoming call for said station set, and means for independently generating in turn first, second and third signals as a function of said first, second and third control signals, respectively, in which said third signal is generated as though it originated from a telephone central office ringing generator.

6. The circuit of claim 5 wherein said first signal is an on-hook signal, and said second signal is an off-hook signal.

7. The circuit of claim 5 further comprising means for notifying said switch network when said station set is off-hook.

8. The circuit of claim 5 further comprising means for notifying said switch network when said station set is on-hook.

9. A subscriber line interface circuit for interfacing a telephone station set with a telephone system comprising means, responsive to receipt of an indicator indicating that said telephone system has received a telephone call for said telephone station set, for outputting a control signal, and means, responsive to receipt of said control signal, for generating internally a ringing signal having a level and frequency as though it were generated by a telephone central office ringing generator and supplying said ringing signal to said station set, said ringing signal being generated independent of any external source of ringing signal.

* * * * *